United States
Ross

[11] 3,803,906
[45] Apr. 16, 1974

[54] APPARATUS FOR CONTROLLING DYNAMIC TESTING EQUIPMENT

[75] Inventor: Rolf Ross, Darmstadt, Germany

[73] Assignee: Firma Carl Schenck Machinenfabrik GmbH, Darmstadt, Germany

[22] Filed: Feb. 23, 1973

[21] Appl. No.: 335,078

[30] Foreign Application Priority Data
Apr. 12, 1972 Germany............................ 2217536

[52] U.S. Cl....................... 73/90, 73/71.7, 73/88 R, 73/11
[51] Int. Cl. .............................................. G01n 3/32
[58] Field of Search............ 73/90, 71.7, 88 R, 71.5, 73/11

[56] References Cited
UNITED STATES PATENTS
3,718,033  2/1973  Petersen .............................. 73/71.7
3,712,125  1/1973  Meyer..................................... 73/90

Primary Examiner—James J. Gill
Assistant Examiner—Anthony V. Ciarlante
Attorney, Agent, or Firm—W. G. Fasse; W. W. Roberts

[57] ABSTRACT

A control system for load testing a sample in a dynamic testing device by means of a servo-hydraulic system includes an outer control circuit which controls the hydraulic system as a function of the load. Resonant oscillation effects are compensated by an inner control circuit which controls the system as a function of the movement of a hydraulic piston. The movement of the mass of the sample may also be employed as a control function.

7 Claims, 2 Drawing Figures

APPARATUS FOR CONTROLLING DYNAMIC TESTING EQUIPMENT

BACKGROUND OF THE INVENTION

The invention relates to an apparatus for controlling dynamic testing equipment such as hydraulically driven equipment and is particularly directed to equipment comprising servo-hydraulic drive means. Such equipment usually includes force sensing means or displacement sensing means with the respective measuring amplifiers, a controlling means and the drive means for the load exerting apparatus. A testing program is supplied to the controlling means as a force or displacement rated value, simultaneously with the measured force or displacement values. Thus, the load for the equipment is controlled in response to a differential value between the rated value and the actually measured value.

Testing equipment of the above type wherein the force to be applied to a test sample, for example, a testing body or to a structural unit to be tested, is directly controlled, is subject to functional troubles during the course of a testing sequence, especially if the sample to be tested is capable of exhibiting resonant oscillations. This is the case, for example, in the testing of samples which may be referred to as spring mass systems such as axles for automotive vehicles, carriages for such vehicles, or other complex structural members as are used in so called light construction. If testing equipment for the dynamic testing of vehicular axles is adjusted in such a manner that no functional troubles occur, reoccurrence of such troubles cannot be avoided even after a minute variation in the axle construction.

Such variations are quite common in the development of new carriage concepts for the purpose of obtaining the best road characteristics. Such functional troubles may disturb substantially the development work on new carriages.

OBJECTS OF THE INVENTION

In view of the above, it is the aim of the invention to achieve the following objects singly or in combination:

to provide means for loading a sample to be tested in a dynamic testing apparatus, so that the loading is independent of resonant oscillations of the sample; and to provide a control apparatus for dynamic testing equipment which prevents the troublesome influences which are due to resonant oscillations of the sample to be tested.

SUMMARY OF THE INVENTION

According to the invention a second or inner control loop is provided. The inner control loop comprises a second measured value pick-up member including a respective measuring amplifier for the displacement or the force and a second control device. An integration value representing the difference value of the first controlling device and constituting the rated displacement or force value for the second controlling device is applied to the second control device. This two fold control by an "outer force control loop" and an "inner displacement control loop" produces the result that the inner displacement controlled loop may absorb the structural characteristics of different structures, especially the resonance characteristics of the test sample, for example of different vehicular carriage constructions. The absorbing of the characteristics takes place in a controlled technical sense, so that these characteristics cannot influence the outer force control loop. Another advantage of the control according to the invention is that the inner and the outer control loop are independent of each other, and are adjustable in sequence, whereby the adjustment of the testing equipment for a new test sample is substantially simplified and shortened.

According to another feature of the invention it is especially advantageous for a testing equipment in which a test sample comprising mass and spring elements is to be tested, if, for example, the value representing the displacement travelled by the mass is supplied to the second control device as an additional measured value.

According to a further feature of the invention, in a testing apparatus in which the second end point of a test sample is not connected to the load apparatus, but is subjected to a certain predeterminable motion, said motion is taken into account by supplying the displacement travelled by the second end point, to the second control device as an additional measured value. Instead of using the displacement travelled by the second end point as an additional measured value for the second control device, the force applied to the test sample may be supplied as an additional measured value to the first control device, whereby such force value is supplied either along or in combination with the above mentioned additional measured value representing the displacement travelled by the second end point.

BRIEF FIGURE DESCRIPTION:

In order that the invention may be clearly understood, it will now be described, by way of example, with reference to the accompanying drawings, wherein:

FIG. 1 is a circuit diagram in block form, according to the invention, in which the displacement travelled by the mass m of the sample to be tested is supplied as an additional measured value to the control means; and FIG. 2 illustrates an arrangement according to the invention in which the second end point of the sample to be tested performs a predetermined movement and the measured value representing such movement is additionally supplied to the control means.

DETAILED DESCRIPTION OF EXAMPLE EMBODIMENTS:

Figure 1:
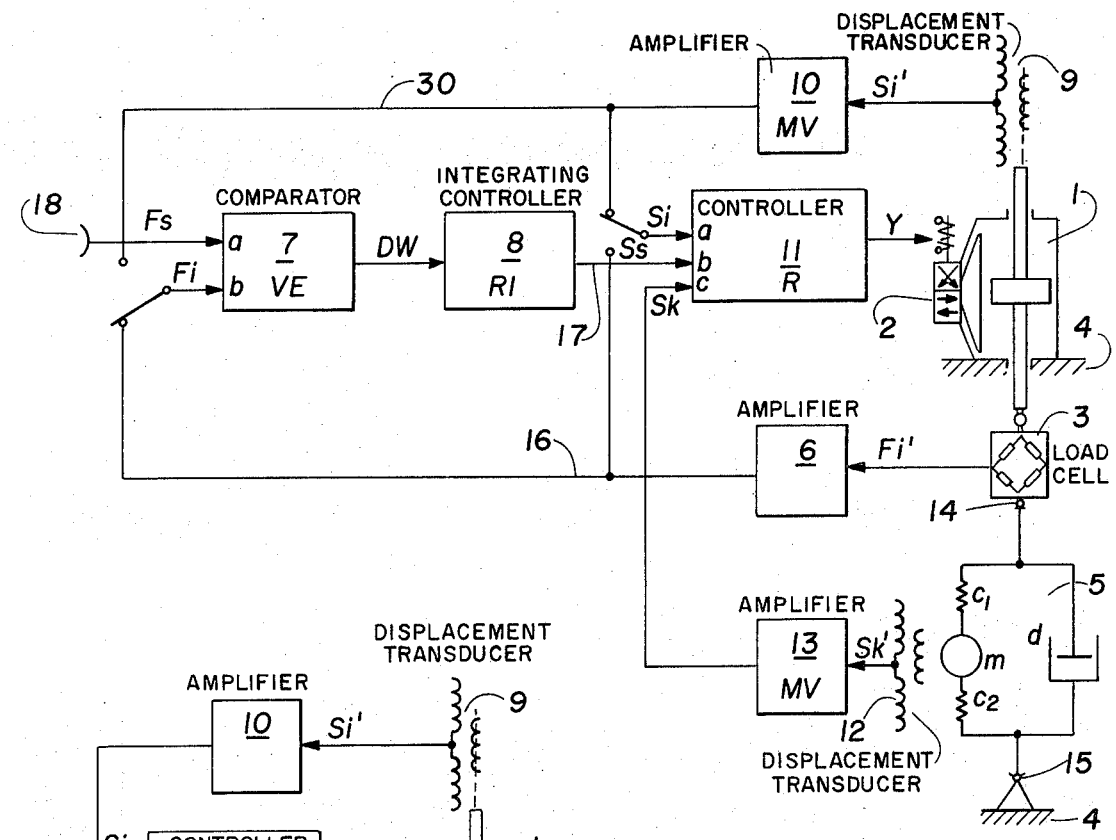

FIG. 1 illustrates a hydraulic piston cylinder arrangement adapted to operate as the load applying device. The piston cylinder arrangement 1 is connected to the frame structure 4 of the testing apparatus. An electrically controlled servo-valve 2 supplies hydraulic fluid under pressure either to the upper or the lower chamber of the cylinder 1 depending on its position. The pressure supply source, for example, a hydraulic pump is not shown in FIG. 1. The piston rod of the cylinder 1 is connected by way of a load cell 3 to an end point 14 of the sample 5 to be tested. The other or opposite end point 15 of the sample 5 is secured to the frame structure 4 of the machine. The sample 5 is illustrated as an equivalent structure comprising at least the springs $c_1$ and $c_2$ and the mass $m$ as well as the damping member $d$, as schematically indicated in FIG. 1. The mass $m$ is capable of exhibiting resonant oscillations since it is supported at both sides by the springs $c1$ and $c2$. The resonance of this system may be calculated in the known manner from the spring rates and from the mass. The load cell 3 may alternatively be connected between the end point 15 of the sample 5 and the frame 4 in accordance with an alternative embodiment of the invention.

The force exerted by the piston of the piston cylinder arrangement 1 on the sample 5 is measured by the load cell 3. The measured or actual force value Fi is supplied through the measuring amplifier 6 and through the conductor 16 to one input $b$ of a comparator 7. The comparator 7 may, for example, be a differential amplifier having a second input $a$ and a signal representing the rated force value is applied to the input $a$. Such rated force value may be supplied by an automatic programming device (not shown) connected to the connector plug 18. A differential signal value Dw appearing at the output of the comparator 7 is supplied to the control member 8. The control member 8 integrates the differential value so that a signal will appear at the output of the integrating controller 8 even if the two inputs to the comparator 7 are equal. The output of the integrator 8 is supplied through a conductor 17 to one input $b$ of a controller 11 whereby this signal represents the desired or rated displacement value Ss. The controller 11 has a further input $a$ connected to the output of a measuring amplifier 10. The input of the amplifier 10 is connected to a displacement measuring device 9 which ascertains the displacement actually travelled by the piston rod of the piston cylinder arrangement 1 so that a signal Si representing the actual piston position is applied to the input $a$ of the controller 11. The displacement transducer may comprise, for example, a pair of axially spaced coils having their junction connected to the input of the amplifier 10 and being inductively coupled to a magnetic core connected to the hydraulic piston. Such devices are conventional.

The measuring amplifier 10 and the controller 11 are constructed, with respect to their characteristic function, so that the geometric configuration or structure of the sample 5 is taken into consideration, whereby resonant oscillations which vary the actual force value Fi and thus cause a differential value Dw, are not effective in the output signal of the controller due to the provision of the amplifier 10 and the controller 11. The amplifier 10 and the controller 11 form an inner control loop which will not respond to disturbing forces to any substantial degree.

Functional disturbances are thus eliminated by employing an inner control loop according to the invention. Such disturbances have been produced heretofore in the known direct force control systems due to the indication of the actual or measured force value Fi resulting from the resonant oscillations of the sample. The elimination of the disturbances is especially advantageous in the testing of vehicle axles. By employing the inner displacement controlled loop of this invention, it is now possible to absorb in a controlled technical manner the structural characteristics of different axle constructions so that these characteristics cannot influence the outer force controlled circuit.

In accordance with the invention the stability of the control may be further improved by measuring the motion of the mass $m$ by means of the displacement sensing device 12. The output of the device 12 is applied by way of a measuring amplifier 13 to the input $c$ of the controller 11 whereby the latter receives a displacement correction value signal Sk. The displacement sensing device 12 may be similar to the displacement sensing device 9 with the magnetic core thereof coupled to the mass $m$. Where the system to be tested includes several oscillating masses, it is possible to ascertain a displacement correction value from one mass which is characteristic of the resonant motions of the other masses. It is also possible to sense displacement or movement correction values from several or even from all of such masses. Such correction values are supplied to the controller 11 by way of respective correction devcies such as sensing means and measuring amplifiers, so that a number of additional inputs are applied to the controller 11.

The servo valve 2 is controlled by a control signal Y which is formed by the controller 11 in response to the differential value between the actual movement or displacement measured value Si and the rated movement value Ss. If desired the controller 11 may also take into account the movement correction value Sk when producing the control signal Y for the servo valve 2.

Figure 2:
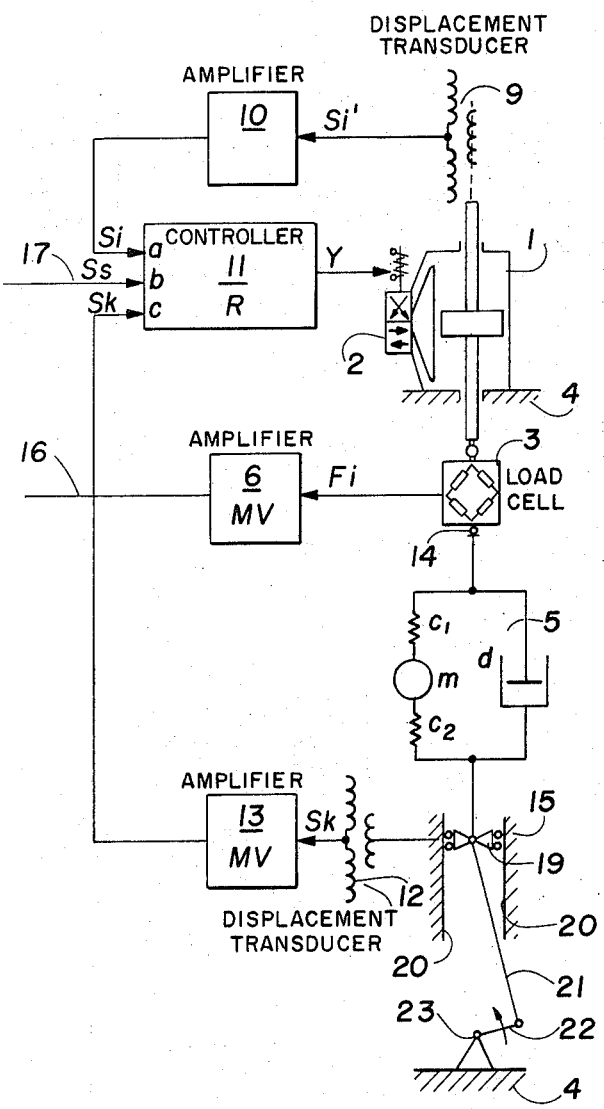

FIG. 2 illustrates another embodiment of the invention in which the second end of the sample 5 is free to move, whereby this so called free end may be moved in a predetermined direction. As shown in the example of FIG. 2, the end point 15 is connected to the structural member 19 which is guided for a vertical back and forth movement by guide rails 20. Instead of the illustrated vertical movement, the guide rails 20 may be arranged in any other desired direction depending on the particular testing conditions.

As shown, the end point 15 is coupled to the displacement or movement sensing device 12 so that a movement correction signal Sk is produced. This signal is applied to the input $c$ of the controller 11 by way of the measuring amplifier 13. The guided structural member 19 is connected by means of a push rod 21 to a crank arm 22 which in turn is pivoted in a pivot bearing 23 attached to the frame structure 4. If the crank arm 22 is rotated steadily, the end point 15 will perform a sinusoidal movement as far as its speed is concerned. However, it should be noted that any other drive means could be used instead of the shown crank drive. For example, the crank drive may be replaced by a further hydraulically controlled piston cylinder arrangement.

In addition to the movement correction value Sk according to the embodiments of FIGS. 1 and 2, it is also possible to apply a force correction value Fk to the controller device. This force correction value may be measured by means of an additional load cell. The additional load cell may be inserted between the end point 15 and the frame 4 as shown in FIG. 1. In the embodiment according to FIG. 2, the additional load cell may be inserted between the end point 15 and the guided structural member 19. In any event, in this modification of the invention, the additional force correction value Fk is supplied to another input of the comparator 7.

It should be noted here that an embodiment has been illustrated in FIGS. 1 and 2 in which the inner control loop comprising the displacement transducer 9, the measuring amplifier 10, the controller 11, and the servo valve 2 as well as the hydraulic piston cylinder arrangement 1 is controlled in response to displacement whereas the outer control loop comprising the load cell 3, the measuring amplifier 6, the comparator 7, as well as the integrating controller 8 and the controller 11 as well as the servo valve and the piston cylinder arrangement 1 are controlled in response to force applied to the test sample. Alternatively, this arrangement may be reversed so that the outer control loop is responsive to a displacement value whereas the inner control loop is responsive to a force value. The type of control which is preferred depends on the particular testing program. Further, it should be noted that under special circumstances a particular value may be controlled twice. For example, if the control program is in the form of a displacement rated value, such value may be supplied to the connector plug 18 of the comparator 7 as a displacement rated value $S_s$, whereas the measured displacement value $S_i$ is supplied to the input $b$ of the comparator 7 as well as to the input $a$ of the controller 11. This arrangement is illustrated by the connection of the load 30 in FIG. 1. By means of this double control it is possible to avoid overriding controls and similar functional disturbances in connection with displacement controlled testing programs.

It is further to be noted that the comparator 7 and the integrating controller 8 may be combined to a single integral structural unit.

Although the invention has been described with reference to specific example embodiments, it is to be understood, that it is intended to cover all modifications and equivalents within the scope of the appended claims.

What is claimed is:

1. In a control system for a dynamic testing device of the type including drive means for applying a load to a sample to be tested, a measuring sensor for providing a first signal corresponding to one measured load characteristic of the drive means, a signal source for providing rated value signals, control means for controlling said drive means, and means for applying said first load representing signal and said rated value signals to said control means, whereby the drive means is controlled in response to the difference of said first and rated value signals; the improvement comprising a second measuring sensor connected to provide a second measured load characteristic signal, further control means, means for applying one of said measured load characteristic signals to said further control means, said first mentioned control means comprising means for integrating the difference of the other of said load characteristic signals and the rated value signal to produce a third signal, and means for applying said third signal to said further control means, whereby said drive means is controlled in response to the difference between one of said measured load characteristic signals and said third signal.

2. The control system of claim 1 for testing a sample including mass and spring elements, further comprising third sensing means connected to produce a signal representing the displacement of said mass, and means for applying said displacement representing signal to said further control means.

3. The control system of claim 1 for testing a sample having one end point coupled to said drive means and another end point which is free to exhibit predetermined displacement, further comprising sensing means for providing a signal corresponding to said predetermined displacement, and means for applying said last mentioned displacement representing signal to said further control means.

4. The control system of claim 1 for testing a sample having one end point coupled to said drive means and another end point not connected to said drive means, further comprising sensing means coupled to said other end point for providing a signal corresponding to force applied to said other end point, and means for applying said last mentioned force representing signal to said further control means.

5. The control system of claim 1, wherein said rated value signal is a displacement rated value signal, and said second signal corresponds to the movement of said driving means, and comprising means for applying said second signal to said integrating means.

6. The control system of claim 1, wherein one measured load characteristic signal is a force representing signal whereas the other measured load characteristic signal is a movement or displacement representing signal.

7. A control system for controlling a dynamic testing device for applying a load to a sample to be tested, comprising a first sensor for producing a first signal corresponding to force applied by said testing device to said sample, a second sensor for producing a second signal corresponding to movement in said device, a source for providing a rated signal, means for combining said rated signal and one of said first and second signals to provide a difference signal, means for integrating said difference signal, and control means for combining said integrated difference signal and the other of said first and second signals to produce a control signal for controlling said testing device.

* * * * *